United States Patent

Thelen et al.

[11] Patent Number: 5,127,681
[45] Date of Patent: Jul. 7, 1992

[54] FLEXIBLE CONNECTOR

[75] Inventors: William G. Thelen, Onondaga; John L. Highlen, Rives Junction, both of Mich.

[73] Assignee: Aeroquip Corporation, Maumee, Ohio

[21] Appl. No.: 803,577

[22] Filed: Dec. 9, 1991

[51] Int. Cl.⁵ .................. F16L 47/02; F16L 47/06
[52] U.S. Cl. ..................... 285/135; 285/167; 285/223; 285/261; 285/263; 285/266; 285/915
[58] Field of Search .............. 285/49, 51, 135, 160, 285/167, 223, 261, 263, 234, 266, 271, 915

[56] References Cited

U.S. PATENT DOCUMENTS

| | | | |
|---|---|---|---|
| 880,813 | 3/1908 | Nailler | 285/261 X |
| 1,949,055 | 2/1934 | Lambie | 285/261 X |
| 2,067,768 | 1/1937 | Krefft | 285/263 |
| 2,154,077 | 4/1939 | Sampson . | |
| 2,188,314 | 1/1940 | Scheffauer | 285/266 |
| 3,680,895 | 8/1972 | Herbert et al. . | |
| 4,068,868 | 1/1978 | Ohrt . | |
| 4,606,599 | 8/1986 | Rammelsberg . | |
| 4,706,998 | 11/1987 | Peppel et al. . | |
| 4,881,759 | 11/1989 | Kovitch et al. | 285/234 X |
| 4,906,027 | 3/1990 | De Gruijter | 285/263 X |

FOREIGN PATENT DOCUMENTS

| | | | |
|---|---|---|---|
| 0069048 | 5/1941 | Czechoslovakia | 285/271 |
| 0928384 | 5/1955 | Fed. Rep. of Germany | 285/261 |
| 0709337 | 8/1931 | France | 285/51 |

Primary Examiner—Randolph A. Reese
Assistant Examiner—Heather Chun
Attorney, Agent, or Firm—Emch, Schaffer, Schaub & Porcello Co.

[57] ABSTRACT

A connector for sealingly joining together lengths of tubing such as those used in automobile fluid conveying systems accommodates large angular bending and twisting motions as a result of a spherical shell which rotates inside guide/thrust circumferential bearings. Noise and vibration damping are achieved by an elastomeric pad of non-uniform thickness bonded between the spherical shell and an enlargement formed on one of the lengths of tubing.

18 Claims, 2 Drawing Sheets

FLEXIBLE CONNECTOR

TECHNICAL FIELD

The present invention relates to the field of connectors for fastening together lengths of tubing and, more particularly, relates to a spherical ball-type connector capable of accommodating large angular bending and twisting motions having a seal highly resistant to leakage and means for damping vibration and noise.

BACKGROUND ART

The following patents have been considered in the preparation of this application: U.S. Pat. Nos. 2,154,077; 2,836,436; 3,680,895; 4,068,868; 4,480,857; 4,606,559; 4,706,998; 4,906,027; and 5,048,873.

Fluid transport systems utilizing rigid lengths of tubing such as copper, steel or aluminum tubing are often subjected to mechanical vibrations which, if not absorbed or dampened may cause tubing failure due to metal fatigue, failure of the seal and may produce undesirable noise. This is particularly true in fluid transport systems used in automobiles and other vehicles.

The present invention provides a flexible connector having a design which absorbs motion between the connected components during operation of the fluid conveying system, dampens system noise and vibration and allows for ease of installation despite some misalignment between adjacent ends to be connected. O-ring seals are incorporated into a guide/thrust ring assembly to provide a seal against leakage of the fluid flowing therethrough while permitting angular movement as well as twisting or rotational movement between adjacent lengths of tubing. Noise and vibration damping are achieved through an elastomeric pad of non-uniform thickness bonded between a spherical shell and another internal shell.

Accordingly, it is an object of the present invention to provide a flexible connector for tubing of the type used in fluid conveying systems for automotive and other use which permits angular bending and twisting motions between the adjacent lengths of tubing and does so in a manner which dampens noise and vibration.

It is another object of the present invention to provide a flexible connector which may readily connect adjacent lengths of tubing notwithstanding the fact that there is some misalignment of such lengths of tubing.

These and other objects of the present invention will become readily apparent from the attached drawings and the following description.

BEST MODE OF CARRYING OUT INVENTION

Figure 1:
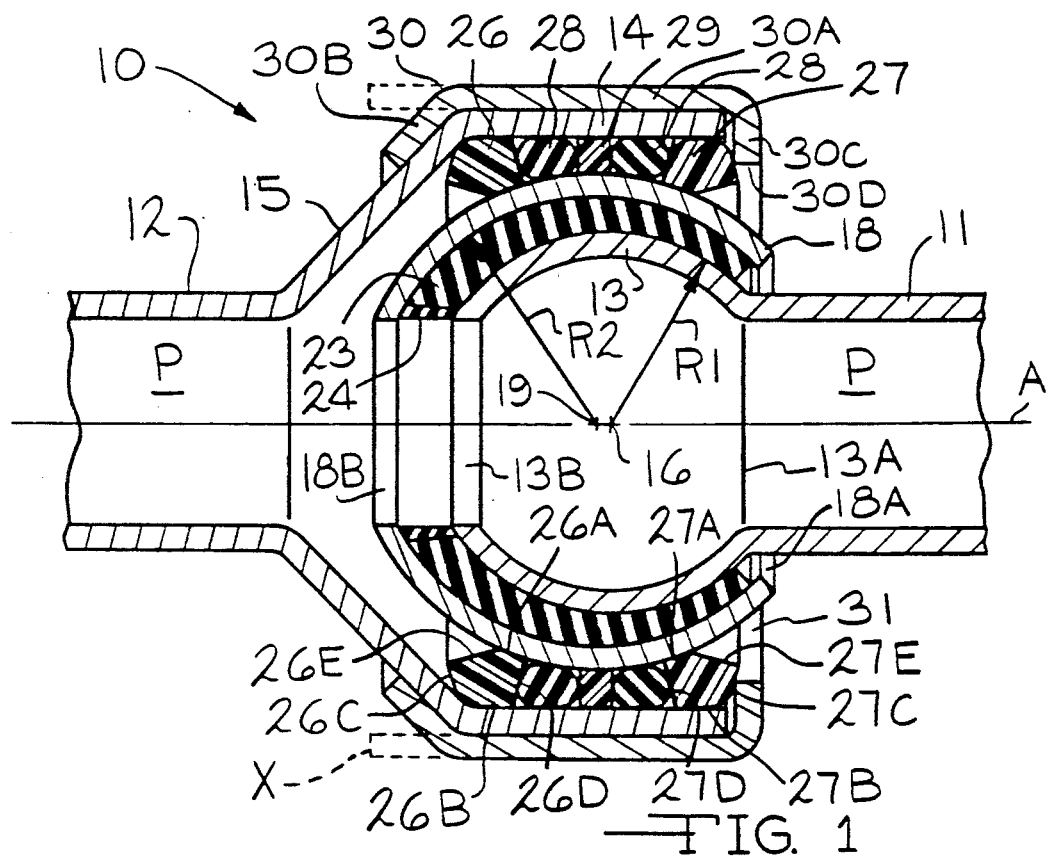
FIG. 1 is a sectional view taken through the longitudinal axis of the flexible connector of the present invention.

Referring now to FIG. 1, there is shown one form of connector 10 of the present invention for fastening together the end of a first length of tubing 11 and the end of a second length of tubing 12. As shown, the first and second lengths of tubing extend along an axis A and each of such lengths of tubing 11 and 12 defines a passageway P for the conveyance of fluid, either liquid or gaseous. It is contemplated that the flexible connector of the present invention could be used in an automotive air-conditioning system for conveying a refrigerant such as freon. However, it will be readily apparent that many types of fluids, gaseous or liquid, could flow satisfactorily through the flexible connector system of the present invention.

As can be seen in FIG. 1, the first length of tubing 11 has been enlarged through processes well-known in the art to form a spherical enlargement 13 extending from a line of juncture 13A with the main body of the tubing 11 to an open end 13B. The spherical enlargement 13 has a radius R1 of predetermined length from a center point 16 to its outer surface. The second length of tubing 12 is enlarged to a significantly larger extent forming an end section 14 having a cylindrical configuration and an intermediate section 15 joining the main portion of the second length of tubing 12 and the cylindrical end section 14. As shown, the intermediate section 15 has a configuration of a frustum of a cone; however, other configurations may be used for such intermediate section 15.

Encircling the spherical enlargement 13 of the first length of tubing 11 is a spherical shell 18 which is a segment of a sphere having a radius R2 extending from a center 19 to its inner surface. The radius R2 is larger than the radius R1 of the spherical enlargement 13 so that there is a space between the outer surface of the spherical enlargement 13 and the inner surface of the spherical shell 18. The spherical shell 18 extends from a first end 18A to a second end 18B and is positioned such that its center point 19 is farther from said line of juncture 13A than is the center point 16. As a result of the center point 19 being farther from the line of juncture 13A than the distance from the center point 16 of the spherical enlargement 13 to such line of juncture 13A, the space between the inner surface of the spherical shell 18 and the outer surface of the spherical enlargement 13 will be of non-uniform thickness and will be thinner at the end 18A adjacent the line of juncture 13A (i.e., the right-hand side as shown in FIG. 1) and larger at the end 18B adjacent the open end 13B. If the diameter of the openings at the ends 18A and 18B are smaller than the outside diameter of the spherical enlargement 13, the spherical shell 18 may be positioned over the end of the length of tubing 11 prior to forming the spherical enlargement. With the spherical shell 18 so positioned, the spherical enlargement 13 may then be formed using procedures well known in the art.

Positioned within the space between the outer surface of the spherical enlargement 13 and the inner surface of the spherical shell 18 is an elastomeric pad 23 of non-uniform thickness. Depending upon the type of elastomeric material used for the pad 23, it may be desirable to provide a second elastomeric pad 24 utilizing a second type of elastomeric material specifically tailored to act as a barrier to resist permeation and degradation from the fluid intended to flow through the passageway P of the joined first length of tubing 11 and second length of tubing 12. For example, the first elastomeric pad 23 could be formed of a suitable plastic or a rubber-like material such as SBR synthetic rubber, natural rubber, neoprene or a urethane material. A suitable elastomeric material is one sold under the name Tornac® manufactured by Polysar, Sarnia, Ontario, Canada. The second layer of elastomeric material 24 may be a material marketed under the name SelarOH by DuPont Chemical, Wilmington, Del., if the fluid flowing through the passageway P is a refrigerant such as Freon®; however, other materials may be utilized depending upon the characteristics of such intended fluid. If the material from which the first elastomeric pad 23 had sufficient resistance to permeation and degradation of the fluid passing through the passageway P, only a single elastomeric pad 23 is necessary.

The elastomeric pads 23, 24, are bonded to the outer surface of the spherical enlargement 13 and to the inner surface of the spherical shell 18. This may be accomplished by assembling the spherical shell 18 around the spherical enlargement 13 and injecting heated and plasticized elastomeric material into the space to form the elastomeric pad 23. In lieu of injecting plasticized elastomeric material into the space, a preformed pad of elastomeric material may be positioned in such space and adhered to the outer surface of the spherical enlargement 13 and the inner surface of the spherical shell 18. If it is desired to utilize a different elastomeric material for the second elastomeric pad 24, a second injection molding step may be utilized to force such second elastomeric material in position. An adhesive may be used to insure a good bond between the elastomeric pads 23 and 24 and the outer surface of the spherical enlargement 13 on one side and the inner surface of the spherical shell 18 on the other side. One such adhesive is one marketed under the name ChemLok® 205/220 by Lord Corporation, Erie, Pa.

The outer diameter of the spherical shell 18 taken through a plane perpendicular to the axis A is smaller than the inner diameter of the cylindrical end section 14 with the result that the spherical shell 18 is in spaced relationship with the inner surface of the cylindrical end section 14.

Positioned within such space are a pair of circumferential nylon bearings 26 and 27 which function as bearings supporting, within the cylindrical end section 14, the assembly consisting of the spherical enlargement 13, the pads 23, 24, and the spherical shell 18. The bearing 26 adjacent the open end 13B of the spherical enlargement 13 includes a first surface 26A contoured with a spherical shape conforming to and engaging the outer spherical surface of the spherical shell 18 and a generally opposing surface 26B having a generally cylindrical configuration conforming to that of the interior surface of the cylindrical end section 14. The bearing 26 is also shown as having a forward surface 26C, a trailing surface 26D and an interior surface 26E extending between the spherical surface 26A and the forward surface 26C.

Similarly, the bearing 27 has a first surface 27A contoured with a spherical-shape conforming to and engaging the outer spherical surface of the spherical shell 18, a cylindrical surface 27B contoured to conform with and engage the interior surface of the cylindrical end section 14, a trailing surface 27C, a forward surface 27D and an interior surface 27E joining the spherical surface 27A with the trailing surface 27C. The bearings 26 and 27 are preferably formed of nylon but may be formed of other materials possessing chemical resistance to the fluid being conveyed and sufficient strength to support the members in sealed position while permitting rotation and pivotal movement between the first length of tubing 11 and the second length of tubing 12. Other suitable materials include various metals, ceramics and other thermoplastics.

Positioned between the bearings 26 and 27 are a pair of O-ring seals 28 which are spaced apart with a nylon or other suitable material circumferential spacer 29 positioned therebetween. Other seals having different configurations may be used in lieu of O-rings. The O-ring seals 28 are preferably formed of a resilient, chemically stable polymeric material such as a flourosilicone polymer known as Neoprene W. Depending upon the fluid being conveyed, other types of materials may be used for the O-ring seals 28 and for the circumferential spacer 29. The O-ring seals 28 are compressed between and form a liquid and vapor tight seal between the outer spherical surface of the spherical shell 18 and the interior surface of the cylindrical end section 14. The O-ring seals 28 may also contact the adjacent bearing 26 or 27 and the spacer 29; however, such contact is not required for a liquid and vapor tight seal.

A collar 30 is provided to secure together the assembly consisting of the spherical enlargement 13, the pads 23, and the spherical shell 18 within the cylindrical end section 14, with the bearings 26 and 27, O-ring seals 28 and spacer 29 therebetween. The collar 30 has a central cylindrical section 30A sized to snugly engage the outer surface of the enlarged cylindrical end section 14 of the second length of tubing 12 and a tapered end section 30B tapering inwardly to a position to engage the intermediate section 15 of such second length of tubing 12. The end of the collar 30 forming the tapered end section 30B initially is cylindrical and extends beyond cylindrical end section 14 as shown in dashed lines labelled X in FIG. 1. After the respective components are joined to the position shown in FIG. 1 but with the cylindrical section 30A of the collar 30 extending longitudinally beyond the cylindrical end section 14 to the position X illustrated in dashed lines, such end portion is deformed to form the tapered end section 30B which snugly engages the tapered intermediate section 15. As can be seen in FIG. 1, such deforming of the collar 30 to form the tapered end section 30B causes flange 30C to firmly engage the bearings 26 and 27 within the space between the spherical shell 18 and the interior surface of the cylindrical end section 14, with the forward surface 26C of bearing 26 being held in place by the juncture of the intermediate section 15 of the second length of tubing 12 with the cylindrical end section 14. If desired, the tapered end section 30B could be preformed in which case the other end forming the flange 30C would initially be a cylindrical extension of cylindrical section 30A and deformed during assembly to form such flange 30C.

As may be appreciated from viewing FIG. 1, the portion of the spherical shell 18 aligned with the spacer 29 may be considered as the apex which is closer to the inner surface of the cylindrical end section 14 than other portions of such spherical shell 18 and the bearings 26 and 26 are positioned on opposite sides of such apex, thus securing in place the assembly of the spherical shell 18, pads 23 and 24 and spherical enlargement 13 of the first length of tubing 11 while permitting pivotal and rotational movement between such assembly and the second length of tubing 12.

As can be readily seen in FIG. 1, the flange 30C of the collar 30 terminates at an end 30D which is radially spaced from the spherical shell 18, thus leaving a gap 31 between such flange end 30D and the outer surface of the spherical shell 18. The presence of the gap 31 coupled with the spherical configuration of the outer surface of the spherical shell 18 slideably engaged to the spherical surfaces 26A and 27A of the bearings 26 and 27, respectively, permits the spherical shell 18 and the first length of tubing 11 bonded thereto by the pads 23 and 24 to move pivotally within the cylindrical end section 14 of the second length of tubing 12. Additionally, as will be appreciated, such construction also permits the spherical shell 18 and such first length of tubing 11 bonded thereto to be moved rotationally relative to the second length of tubing 12.

If desired, the outer surface of the spherical shell 18 may be provided with a Teflon ® coating which will serve to reduce the frictional wear on the bearings 26 and 27 and the seals 28 thereby increasing their useful life. Other friction reducing coatings may be used in lieu of the Teflon ® coating.

As previously discussed, the space between the outer surface of the spherical enlargement 13 and the inner surface of the spherical shell 18 and, therefore, the elastomeric pad 23 which is bonded therebetween is of non-uniform thickness. Thus, the thickness of the elastomeric pad 23 adjacent the open end 13B of the spherical enlargement 13 is significantly thicker than the portion of the elastomeric pad 23 adjacent the line of juncture 13A of the spherical enlargement 13. The non-uniform thickness of the pad 23 is a critical and significant feature of the present invention and it should always be thicker at the end adjacent the open end 13B.

Figure 2:
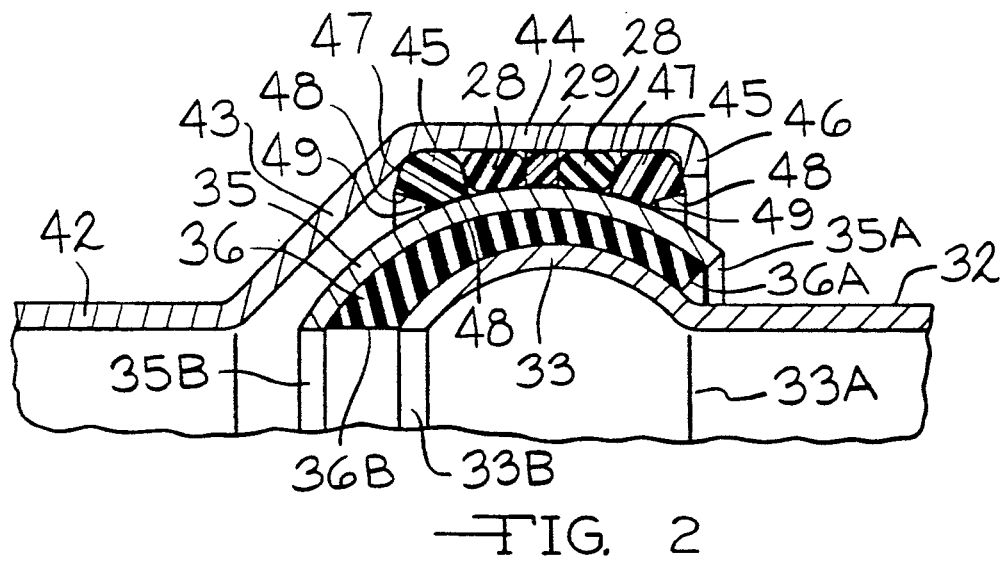
FIG. 2 is a sectional view similar to FIG. 1 showing a another embodiment of the present invention.
Figure 4:
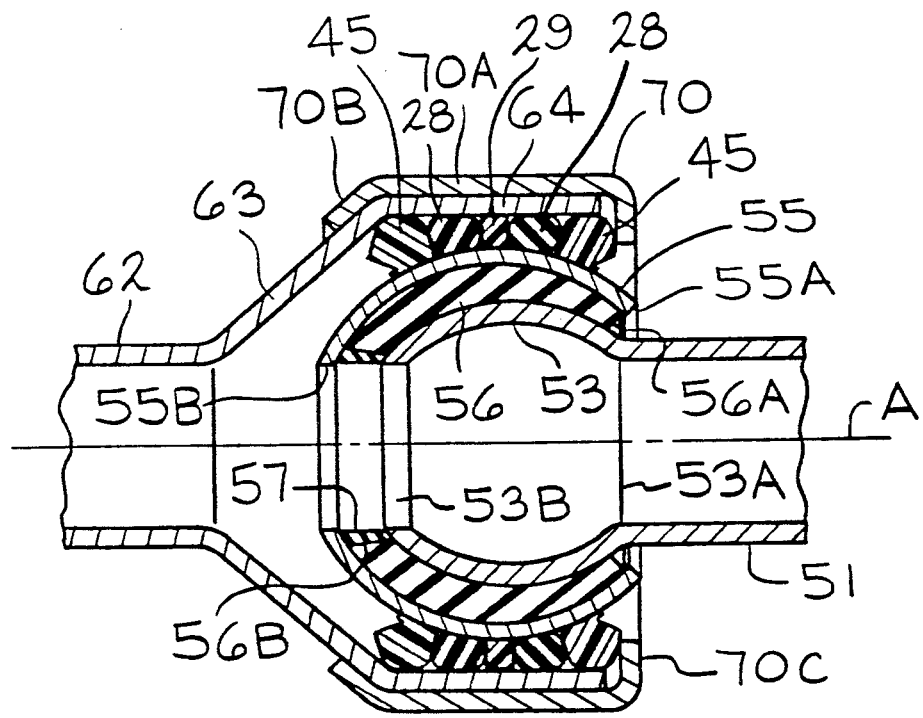
FIG. 4 is a sectional view of a further embodiment of the present invention.

As will become clear from a description of the embodiments of FIGS. 2 and 4, it is not necessary that the enlarged end of the first length of tubing 11 have a spherical configuration. Rather, such first length of tubing 11 could have an enlargement with any of a wide variety of configurations. However, it is important that the outer surface of the spherical shell 18 have a spherical configuration in order to permit it to move angularly and rotationally with respect to the cylindrical end section 14 and the bearings 26 and 27.

Under the embodiment of FIG. 2, there is provided a first length of tubing 32 having an enlargement 33 which may have any of a wide variety of configurations including but not limited to ellipsoidal and ones having in cross section parallel to the axis A, a parabolic or other curvilinear path. The enlargement 33 extends from a line of juncture 33A with the main body of tubing 32 to an open end 33B.

There is also provided a spherical shell 35 encircling the enlargement 33 in spaced relationship such that the space between the inner surface of the spherical shell 35 and the outer surface of the enlargement 33 is larger at the end 35B adjacent the open end 33B than at the end 35A adjacent the line of juncture 33A. Positioned within such space is a single elastomeric pad 36 of non-uniform thickness which is thicker at the end 36B adjacent the open end 33B than the end 36A adjacent the line of juncture 33A. The pad 36 is bonded to the outer surface of the enlargement 33 and the inner surface of the spherical shell 35.

There is also provided a second length of tubing 42 having an enlarged cylindrical end section 44 joined to the main tubing portion 42 by an outwardly tapering intermediate section 43. The cylindrical end section 44 and intermediate section 43 encircle the assembly of the spherical shell 35, pad 36 and enlargement 33 in spaced relationship with the outer surface of the spherical shell 35.

Positioned within the space between the spherical shell 35 and cylindrical end section 44 are a pair of O-ring seals 28, a circumferential spacer 29 and a pair of universal bearings 45. In contrast to the embodiment of FIG. 1 which utilized bearings 26 and 27 having non-symmetric cross-sectional shapes, the universal bearings 45 used in this embodiment are identical to one another and; therefore, do not require the care in assembly required for the FIG. 1 embodiment.

A flange 46 extends radially inwardly from cylindrical end section 44 and engages the adjacent universal bearing 45. The other universal bearing 45 is engaged by the interior surfaces of the intermediate section 43 and the cylindrical end section 44.

Each of the universal bearings 45 includes an exterior surface 47 following a generally U-shaped configuration with the legs of the U tapering outwardly and a pair identical interior surfaces 48 which follow a spherical configuration similar to that of the outer surface of the spherical shell 35. As an optional feature, there may be provided a radially inwardly extending lip 49 extending from the respective interior surfaces 48 and lying on a plane extending centrally through the bearing 45. Upon joining the various elements of the connector together, the lip 49 of each of the universal bearings 45 will, under pressure, be bent or folded over to act as a dust wiper as it moves against the exterior surface of the spherical shell 35 upon movement of it and the first length of tubing 32 relative to the second length of tubing 42.

The embodiment of FIG. 2 is less expensive than the embodiment of FIG. 1 in that it does not utilize a collar. The modification of the flexible connector of the present invention shown in FIG. 2 is particularly well-suited for joining together lengths of tubing which are subjected to lower internal pressure, for example, something on the order of less than 230 psi. Thus, while the embodiment shown in FIG. 1 utilizing the collar 30 for securing the various members together may be used for systems which operate under pressure in excess of 230 psi and as high as 500 psi or even higher, the embodiment of FIG. 2 is less expensive and is satisfactory for lower pressure applications.

For some applications, including ones subjected to low internal pressures, it is possible to have only a single O-ring seal 28 in which case it will not be necessary to have a spacer 29. Such modified connector would have at least two bearings 26, 27 or 45, 45 with one O-ring seal 28 positioned therebetween in sealing engagement with the outer surface of the spherical shell 18 or 35 in the area of the apex and the interior surface of the cylindrical end section 14 or 44.

Figure 3:
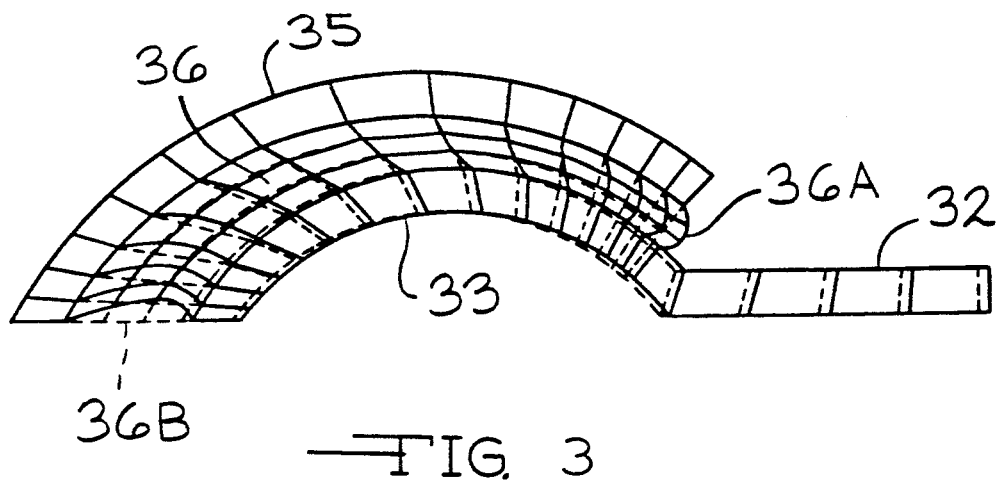
FIG. 3 is a view showing by means of a finite element mesh, deformation of the elastomeric pad portion of the flexible connector as a result of stresses imparted to the system due to internal pressure.

Referring now to FIG. 3, there is shown a finite element mesh which demonstrates the effect on the elastomeric pad 36 of the embodiment of FIG. 2 due to internal pressure within the joined lengths of tubing 32 and 42. As will be appreciated, such internal pressure results in movement of the first length 32 axially relative to the second length 42. Such analysis shows why it is necessary that the elastomeric pad 36 be of non-uniform thickness with the thicker end 36B adjacent the open end 33B of the enlargement 33 and the thinner end 36A spaced away from such open end 33B.

The elastomeric pad 36, although possessing significant resistance to compressive stresses is much less resistant to tensile stresses. As will be appreciated and as can be seen schematically in FIG. 3, the application of internal pressure within the passageway of the first and second lengths of tubing 32 and 42 will cause the first length 32 having the enlargement 33, to be moved a slight distance axially, thus, tending to pull away from the second length of tubing 42. However, the enlargement 33 and the spherical shell 35 with the elastomeric pad 36 bonded thereto are prevented from such axial movement as a result of the bearings 45 which are firmly held in place as previously described engaging the outer surface of the enlargement 33. As a result, the portion of the pad 36 toward the end 36A is subjected to compressive stresses and bulges outwardly in response to such compressive stresses.

In contract, the portions of the pad 36 adjacent the end 36B are placed in tension as a result of the increased distance between the open end 33B of the enlargement 33 and the end 35B of the spherical shell 35 upon such axial movement of the first length of tubing 32.

In FIG. 3 there is shown schematically only those portions of the flexible connector required to illustrate the stress analysis, namely, first length of tubing 32, its enlargement 33, the spherical section 35 and the non-uniform thickness pad 36. Each of the first length of tubing 32, its enlargement 33 and the pad 36 are shown with two sets of mesh lines, the first being dashed lines showing the positions of those respective members before the application of internal pressure within the passageway and the second being solid lines showing, for each such mesh line portion, the movement of that portion in response to internal pressure within the passageway of 500 psi. The spherical shell 35 has only a single set of lines as it is prevented from moving axially.

It can be readily seen from FIG. 3 that the end 36A of the pad 36 is being squeezed outwardly to the right as a result of the extreme compressive forces placed upon it by movement of the first length of tubing 32 and its enlargement 33 to the right, thereby reducing the size of the space for the pad 36. In contrast, that portion of the pad 36 adjacent the nd 36B is subjected to a tensile stress as a result of movement of those portions of the two elements to which it is bonded, namely, the interior surface of the spherical shell 35 and the exterior surface of the enlargement 33, away from one another. Thus, the respective portions of the pad 36 illustrated by the mesh lines are caused to move from the positions illustrated by the dashed lines to the positions in solid lines. As a result of such non-uniform thickness of the pad 36, the connector of the present invention is permitted to function satisfactorily without breaking the bonds between the pad 36 and (1) the outer surface of the enlargement 33 and (2) the inner surface of the spherical shell 35. Such design imparts high compressive stresses in the thin end of the pad 36A and significantly lower magnitude tensile stresses in the thick end 36B.

Under the embodiment of FIG. 4, there is provided a first length of tubing 51 having an enlargement 53 which may have any of a wide variety of configurations including but not limited to ellipsoidal and ones having, in cross section parallel to the axis A a parabolic or other curvilinear path moving from its line of juncture 53A with the fixed diameter tubing 51 to the open end 53B.

As in the previous embodiments, there is provided a spherical shell 55 encircling the enlargement 53 in spaced relationship and extending from an end 55A adjacent the line of juncture 53A to an end 55B adjacent the open end 53B. The space between the inner surface of the spherical shell 55 and the outer surface of the enlargement 53 is larger at the end 55B adjacent the open end 53B than at the end 55A. Positioned within such space is an elastomeric pad 56 of non-uniform thickness which is thicker at the end 56B adjacent the open end 53B than at the other end adjacent the line of juncture 53A. A second pad 57 of elastomeric material specifically tailored to resist permeation and degradation from the fluid intended to flow through the passageway may be adhered to the pad 56. The pads 56, 57, should be bonded to the outer surface of the enlargement 53 and to the inner surface of the spherical shell 55.

There is also provided a second length of tubing 62 having an enlarged cylindrical end section 65 joined to the main tubing portion 62 by an outwardly tapering intermediate section 63.

The outer diameter of the spherical shell 55 is smaller than the inner diameter of the cylindrical end section 65 with the result that the spherical shell 55 is in spaced relationship with the inner surface of the cylindrical end section 54. Positioned within such space are a pair of circumferential nylon bearings 45 which function as bearings supporting the assembly consisting of the enlargement 53, the pads 56, 57, and spherical shell 58 within the cylindrical end section 64.

Positioned between the bearings 45 are a pair of O-ring seals 28 which are spaced apart with a nylon circumferential spacer 29 positioned therebetween.

A collar 70 is provided to secure together the assembly consisting of the enlargement 53, the pads 56, 57, and the spherical shell 58 within the cylindrical end section 64, with the bearings 45, O-ring seals 28 and spacer 29 therebetween. The collar 70 as a central cylindrical section 70A sized to snugly engage the outer surface of the enlarged cylindrical end section 64 of the second length of tubing 62 and a tapered end section 70B tapering inwardly to a position to engage the intermediate section 63 of such second length of tubing 62. The end of the collar 70 opposite the tapered end section 70B initially is cylindrical and, after the respective components are joined to the position shown in FIG. 4 but with the cylindrical section 70A of the collar 70 extending longitudinally beyond the trailing surface of bearing 45, such end portion is deformed to form a radially inwardly directed flange 70C which snugly engages the trailing surface of bearing 45 thus securing the assembly of the spherical shell 58, pads 56 and 57 and enlargement 53 in place while permitting pivotal and rotational movement between such assembly and the second length of tubing 62.

Other modifications will become readily apparent to those skilled in the art. For example, the connector of the present invention could be used to connect lengths of rigid tubing formed of plastic as well as metal or one length formed of plastic to a length formed of metal. Accordingly, the scope of the present application should be limited only by the scope of the appended claims.

We claim:

1. A connector for sealingly joining together opposing ends of first and second lengths of rigid tubing comprising
    (a) an inner shell having a first section extending from said first length along an axis and a bulbous section extending outwardly to a radial extent greater than said first section, said bulbous section terminating in an open end;
    (b) a spherical shell encircling said bulbous section and cooperating therewith to define a space, the breadth of that portion of said space adjacent said open end being greater than the breadth of said space at the other end of said spherical shell, said spherical shall having an outer surface defining a segment of a sphere;

(c) elastomeric pad means in said space adhered to said spherical shell and to said bulbous section, said elastomeric pad means extending from a relatively thicker portion adjacent said open end to a thinner portion adjacent said other end;

(d) an outer shell having a first section extending from said second length, an outwardly flaring wall section and a housing section having an inner surface sized to receive therein said spherical shell in spaced relationship thereto;

(e) a plurality of spaced apart circumferential bearings in the space between said spherical shell outer surface and said housing inner surface, each of said bearings having a first surface engaged to said housing inner surface and a second surface engaged to said spherical shell outer surface;

(f) at least one gasket means between said bearings in the space between and sealingly engaged to said spherical shell outer surface and said housing inner surface; and, (g) flange means for retaining said bonded inner shell bulbous section and said spherical shell within said outer shell housing section.

2. A connector according to claim 1, wherein said flange means is integral with said outer shell housing section.

3. A connector according to claim 1, wherein said flange means is integral with a collar, said collar encircling said outer shell and engaging said outwardly flaring wall section.

4. A connector according to claim 1, wherein said flange means engages one of said bearings.

5. A connector according to claim 1, wherein said spherical shell outer surface has an apex which is closer to said inner surface than other portions of said spherical shell and one of said bearings is on one side of said apex and another of said bearings is on another side of said apex.

6. A connector according to claim 5, further including a spacer engaging said apex and said inner surface and wherein said seal means are positioned on both sides of said spacer.

7. A connector according to claim 1 further including coating means for reducing the frictional drag between said spherical shell outer surface and said circumferential bearings.

8. A connector according to claim 1, wherein said inner shell bulbous section is a segment of a sphere having a center spaced from said open end a distance which is greater than the distance than the center of said spherical shell is spaced from open end.

9. A connector according to claim 1, wherein said pad means is bonded thereto, at the end adjacent said open end, said pad means being resistant to permeation of fluid flowing through said first and second lengths of tubing.

10. A connector for joining together an end of a first length of tubing and an end of a second length of tubing comprising:

(a) a bulbous end portion on said first length having a passageway extending therethrough and terminating in an open end;

(b) a spherical shell having a spherical exterior surface of predetermined diameter encircling said bulbous end portion in spaced relationship defining a gap, the size of said gap being greater at said open end than at other portions of said bulbous end portion;

(c) pad means positioned in said gap adhered to said spherical shell and to said bulbous end portion said pad means extending from a relatively thicker portion adjacent said open end to a thinner portion spaced from said open end;

(d) an enlarged receiving end on said second length, said enlarged receiving end including a segment having a cylindrical interior surface with a diameter larger than said spherical shell predetermined diameter, an intermediate section tapering from said enlarged receiving end to a size smaller than said predetermined diameter, said bonded spherical shell and bulbous end portion being received within said enlarged receiving end with a space between said spherical exterior surface and said cylindrical interior surface and the interior surface of said tapering intermediate section;

(e) bearing means in at least two portions of said space, each of said bearing means having a cylindrical surface engaged with said cylindrical interior surface and a spherically shaped surface engaged to said spherical exterior surface;

(f) seal means between said bearing means encircling said spherical exterior surface in sealing relationship therewith and sealingly engaged with said cylindrical interior surface; and, (g) radially inwardly extending flange means engaged to one of said bearing means.

11. A connector according to claim 10, wherein said radially inwardly directed flange means is integral with said second length.

12. A connector according to claim 10, further including a collar encircling said second length enlarged receiving end and engaging said intermediate section, said flange means being integral with said collar.

13. A connector according to claim 10, wherein said spherical exterior surface has an apex which is closer to said cylindrical interior surface than other portions of said spherical exterior surface and one of said bearing means is on one side of said apex and another of said bearing means is on another side of said apex.

14. A connector according to claim 13, further including a spacer engaging said apex and said cylindrical interior surface and wherein said seal means are positioned on both sides of said spacer.

15. A connector according to claim 10, wherein said flange means engages one of said bearing means.

16. A connector according to claim 10 further including coating means for reducing the frictional drag between said spherical exterior surface and said bearing means.

17. A connector according to claim 10, wherein said bulbous end portion si a segment of a sphere having a center spaced from said open end a distance which is greater than the distance the center of said spherical shell is spaced from open end.

18. A connector according to claim 10, wherein said pad means is bonded thereto, at the end adjacent said open end, said pad means being resistant to permeation of fluid flowing through said first and second lengths of tubing.

* * * * *